(12) United States Patent
Andersson et al.

(10) Patent No.: US 11,912,242 B2
(45) Date of Patent: Feb. 27, 2024

(54) RACK SYSTEM FOR A MOTOR VEHICLE

(71) Applicant: Volvo Car Corporation, Gothenburg (SE)

(72) Inventors: Kristoffer Andersson, Gothenburg (SE); Jan Nilsson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 63 days.

(21) Appl. No.: 17/220,052

(22) Filed: Apr. 1, 2021

(65) Prior Publication Data
US 2021/0309159 A1 Oct. 7, 2021

(30) Foreign Application Priority Data

Apr. 3, 2020 (EP) .................................... 20167991

(51) Int. Cl.
| | | |
|---|---|---|
| *B60R 9/06* | (2006.01) | |
| *H02J 7/00* | (2006.01) | |
| *B60R 9/10* | (2006.01) | |
| *H01M 10/46* | (2006.01) | |

(52) U.S. Cl.
CPC .................. *B60R 9/06* (2013.01); *B60R 9/10* (2013.01); *H01M 10/46* (2013.01); *H02J 7/0063* (2013.01); *Y02T 10/70* (2013.01)

(58) Field of Classification Search
CPC .. B60R 9/06; B60R 9/042; B60R 5/04; B60R 9/0426; B60R 9/065; B60R 9/10; H02J 7/0063
USPC .................................................. 414/462, 463
See application file for complete search history.

(56) References Cited

U.S. PATENT DOCUMENTS

| | | | |
|---|---|---|---|
| 5,029,740 A | 7/1991 | Cox | |
| 6,037,746 A * | 3/2000 | Sheng | B60L 50/66 320/104 |
| 6,884,018 B1 * | 4/2005 | Dugan | B60P 3/07 414/917 |
| 7,785,058 B2 * | 8/2010 | Ray | B60R 9/065 224/527 |
| 8,800,582 B2 * | 8/2014 | Hooper | B60J 11/00 135/96 |

(Continued)

FOREIGN PATENT DOCUMENTS

| | | |
|---|---|---|
| CN | 103832844 A | 6/2014 |
| CN | 105858542 A | 8/2016 |

(Continued)

OTHER PUBLICATIONS

Extended EP Search Report for EP Application No. 20167991.7 dated Sep. 23, 2020, 8 pages.

(Continued)

*Primary Examiner* — Gregory W Adams
(74) *Attorney, Agent, or Firm* — Amin, Turocy & Watson, LLP

(57) ABSTRACT

A rack system for a main motor vehicle, comprising: a rack unit mountable to a rear side of the main motor vehicle, wherein the rack unit is configured to carry at least one electric auxiliary vehicle comprising at least one battery unit to power the electric auxiliary vehicle; an electric charging unit configured to electrically charge the battery unit of the at least one electric auxiliary vehicle with more than 12 Volts; wherein the electric charging unit is arranged at the rack unit.

20 Claims, 2 Drawing Sheets

(56) References Cited

U.S. PATENT DOCUMENTS

| | | | | |
|---|---|---|---|---|
| 8,827,128 | B2* | 9/2014 | Degenstein | B60R 9/06 224/924 |
| 9,669,769 | B2* | 6/2017 | Cha | B60R 9/10 |
| 9,781,552 | B2* | 10/2017 | Toya | H02J 7/02 |
| 9,914,364 | B2* | 3/2018 | Shumaker | B60L 58/21 |
| 2003/0102842 | A1* | 6/2003 | Tamai | H01M 10/4285 320/106 |
| 2010/0084532 | A1* | 4/2010 | Nielsen | H05K 7/02 248/346.03 |
| 2011/0215921 | A1* | 9/2011 | Ben Ayed | G08B 1/08 340/539.11 |
| 2012/0205413 | A1 | 8/2012 | Degenstein et al. | |
| 2013/0119925 | A1* | 5/2013 | Kawamura | H02J 7/0042 320/108 |
| 2014/0369798 | A1* | 12/2014 | Escande | B60L 53/80 414/584 |
| 2018/0086279 | A1* | 3/2018 | Anton | B62H 3/12 |
| 2019/0052714 | A1* | 2/2019 | Shin | H04L 67/1095 |

FOREIGN PATENT DOCUMENTS

| | | | | |
|---|---|---|---|---|
| CN | 210011612 U | 2/2020 | | |
| DE | 202011106704 U1 | 1/2012 | | |
| DE | 10-2011011252 A1 | 8/2012 | | |
| DE | 102017003609 A1 * | 10/2017 | | B60R 9/10 |
| DE | 102017121568 A1 * | 3/2019 | | B60R 9/10 |
| EP | 3386070 A1 | 10/2018 | | |

OTHER PUBLICATIONS

Communication Pursuant to Article 94(3) EPC received for European Patent Application Serial No. 20167991.7 dated Apr. 7, 2022, 4 pages.

* cited by examiner

RACK SYSTEM FOR A MOTOR VEHICLE

CROSS-REFERENCE TO RELATED APPLICATIONS

This application claims priority to EP patent application no. 20167991.7 filed 3 Apr. 2020, entitled "RACK SYSTEM FOR A MOTOR VEHICLE." The entirety of the aforementioned application is hereby incorporated herein by reference.

TECHNICAL FIELD

The present disclosure relates to a rack system for a motor vehicle, a use of a rack unit and/or a charging unit in such a rack system and to an electric motor vehicle comprising at least one traction battery and such a rack system.

BACKGROUND ART

Micro-mobility is increasing rapidly, especially in urban areas. Electric scooters and other electric vehicles are powered by batteries that have to be charged at appropriate charging stations. In some city, the use of cars or vehicles with combustion engines is already restricted, and this trend is likely to increase due to sustainability policies. This will further increase the use of electric mobility vehicles, in particular for the so-called first and last mile.

In view of this, it is found that a further need exists to provide further options to support micro-mobility.

SUMMARY

In the view of the above, it is an object of the present invention to provide further options for supporting micro-mobility.

These and other objects, which become apparent upon reading the following description, are solved by the subject matter of the independent claims. The dependent claims refer to preferred embodiments of the invention.

According to a first aspect, a rack system for a main motor vehicle 20 is provided, comprising: a rack unit 30 mountable to a rear side of the main motor vehicle 20, wherein the rack unit 30 is configured to carry at least one electric auxiliary vehicle 40 comprising at least one battery unit to power the electric auxiliary vehicle 40; an electric charging unit 35 configured to electrically charge the battery unit of the at least one electric auxiliary vehicle 40 with more than 12 Volts; wherein the electric charging unit 35 is arranged at the rack unit 30.

A rack unit 30 according to the present disclosure is to be understood as any arrangement suitable to carry an electric auxiliary vehicle 40 in such a way that it can be held securely during a movement of the main motor vehicle 20. A main motor vehicle 20 is any vehicle capable of carrying a rack unit 30. An electric auxiliary vehicle 40 can be any electrically powered vehicle that can be mounted on a rack unit 30.

It has found that by means of a rack unit 30 comprising an electric charging unit 35 both can be provided transportation and charging of electric auxiliary vehicles 40. By utilizing an electric car's traction battery, the rack unit 30 may charge one or several electric auxiliary vehicles 40. The rack system also provides transportation and storage, enabling multimodal scenarios for the main motor vehicle 20 users. In cities with restricted entry or parking due to congestion or sustainability issues, this solution might allow entry or free parking, if the rack system is used for semi-altruistic charging, e.g. of free-floating e-mobility vehicles. Such a solution will also benefit the free-floating service providers, since the rack system can provide an alternative to manual charging. In cities with restricted entry or parking due to congestion- or sustainability issues, this solution might allow entry or free parking, if the rack system is used for charging, e.g. of free-floating e-mobility vehicles. These vehicles need fixation to avoid mishandling by other users, leading to scratches and damages of the car. The rack system can provide fixation, while allowing charging.

In a possible implementation, the electric charging unit 35 may be configured to be connected to at least one traction battery of the main motor vehicle 20 so that the electric charging unit 35 obtains electrical energy from the traction battery of the main motor vehicle 20. A traction battery is a battery that is used to drive the main motor vehicle 20. It is therefore a possible implementation that the main motor vehicle 20 may at least partially electrically drivable and not a vehicle with a drive system that only includes a combustion engine. This is preferred because such a vehicle includes a comparatively strong traction battery that can also provide voltages above 12 volts, which is needed for electric auxiliary vehicles 40 having a long range and long operating time. In this respect, in a further possible implementation, the electric charging unit 35 can be configured to electrically charge the battery unit of the at least one electric auxiliary vehicle 40 with a voltage of 24 Volt, 36 Volt, 42 Volt and/or 48 Volt.

In addition, in a possible implementation, the rack system may include indicator means, e.g. a display or an LED means, that show whether the traction battery of the main motor vehicle 20 still has sufficient charge to allow/enable charging of an electric auxiliary vehicle 40.

In a further possible implementation, the electric charging unit 35 can be configured to electrically charge the battery of the electric auxiliary vehicle 40 independent of an access to and/or an operation of the main motor vehicle 20. This makes it possible to enable a so-called altruistic loading of electric auxiliary vehicles 40. In other words, third parties may use the rack system and load their electric auxiliary vehicles 40. If such an altruistic loading facility is provided for third parties, the driver can be allowed to drive and park in otherwise closed-off areas of a city. It is also possible to provide special parking spots/facilities for main motor vehicles 2 permit/authorize such an altruistic loading of third party's electric auxiliary vehicles 40. Thus, by providing charging for these vehicles, the car owner/user can benefit from e.g., access to parking, free parking, access to restricted areas, or other benefits like monetary reimbursement.

In an embodiment, the electric charging unit 35 may comprise electrical connection means 39 configured to provide an electrical connection to a battery unit of an electric auxiliary vehicle 40 arranged adjacent to the rack system. A charging cable may provide such connection means. This makes it possible to load not only electric auxiliary vehicles 40 arranged on the rack unit 30, but also electric auxiliary vehicles 40 arranged next to the main motor vehicle 20.

In a further implementation, the rack unit 30 may comprise mounting means configured to mount the rack unit 30 to a tow bar and/or to a rear part of the main motor vehicle 20. By connecting the rack unit 30 to a tow bar, a rack unit 30 according can be easily and securely connected to an existing connection system of the main motor vehicle 20 without the need for further modifications to the main motor vehicle 20.

In a possible implementation, the rack unit 30 may comprise lifting means configured to lift the electric auxiliary vehicle 40 from a street level position to an elevated level. This makes loading and unloading easier and also allows heavier electric auxiliary vehicles 40 to be positioned on the rack unit 30.

In an implementation, the rack unit 30 may comprise a protection cover to protect the main motor vehicle 20 from the electric auxiliary vehicle 40. This prevents damage to the main motor vehicle 20 when loading and unloading the rack unit 30. For example, such a protection cover can be provided by a plastic wall or similar means.

In a further possible implementation, the rack unit 30 may comprise locking means configured to lock the electric auxiliary vehicle 40 relative to the rack unit 30. Such locking means can be used to lock the electric auxiliary vehicle 40 with the rack unit 30 so that no unauthorized third party can remove the electric auxiliary vehicle 40. Such locking means can be provided by locks, strap elements and/or bracket elements, for example.

In a possible implementation, the rack unit 30 may comprise releasing means configured to allow a release of the electric auxiliary vehicle 40 from the rack unit 30 independent of an access to and/or operation of the main motor vehicle 20. This makes it possible, for example, for a third party who does not have access to the main vehicle to position his electric auxiliary vehicle 40 on or at the rack unit 30 and charge it via the main vehicle. Such releasing means can be provided, for example, by a lock element, a strap element and/or a bracket element comprising a controllable locking element with which the electric auxiliary vehicle 40 can be released from the rack unit 30.

In a possible embodiment, the rack system may further comprise communication means 36 configured to provide a communication between the rack system and a mobile computer device in order to perform an authentication and/or an approval before an electric auxiliary vehicle 40 can be electrically charged and/or before the electric auxiliary vehicle 40 may be released by the releasing means. The communication means 36 may be short-range communication means 36, such as a Bluetooth communication interface. However, it is also possible that a mobile radio interface is used and communication between the rack system and a smartphone as a mobile computer device takes place via a mobile radio network. Such authentication can take place, for example, by means of an app installed on a smartphone, to which a user must first register and login.

In this respect, in a further possible embodiment, the rack system may comprise a timing unit 37 to manage a charging duration relative to an estimate parking duration. Alternatively or additionally, a connection to the on-board computer of the main vehicle may be provided so that the on-board computer can manage the charging duration. In this context, it is also possible to provide for invoicing for the charging based on the charging duration.

In an embodiment, the at least one electric auxiliary vehicle 40 to be carried by the rack unit 30 can be an electric two-wheel vehicle, wherein the rack unit 30 may comprise at least one carrier element having a u-shaped cross-section in which the wheels of the electric auxiliary vehicle 40 are arrangeable. This makes it easy to fit or slide-in the wheels of the electric vehicle into the carrier element from the freely accessible side. It is further possible that the carrier element is positioned at the bottom, e.g. street level, during the slide-in process.

A further aspect relates to a use of a rack unit 30 and/or a charging unit in a rack system as described above.

Finally, a further aspect relates to an electric motor vehicle comprising at least one traction battery and a rack system as described above, wherein the electric charging unit 35 is connected to the at least one traction battery of the electric motor vehicle.

BRIEF DESCRIPTION OF DRAWINGS

In the following, the disclosure is described exemplarily with reference to the enclosed figure, in which.

Notably, the figures are merely schematic representations and serve only to illustrate embodiments of the present disclosure. Identical or equivalent elements are in principle provided with the same reference signs.

DESCRIPTION OF EMBODIMENTS

Figure 1:
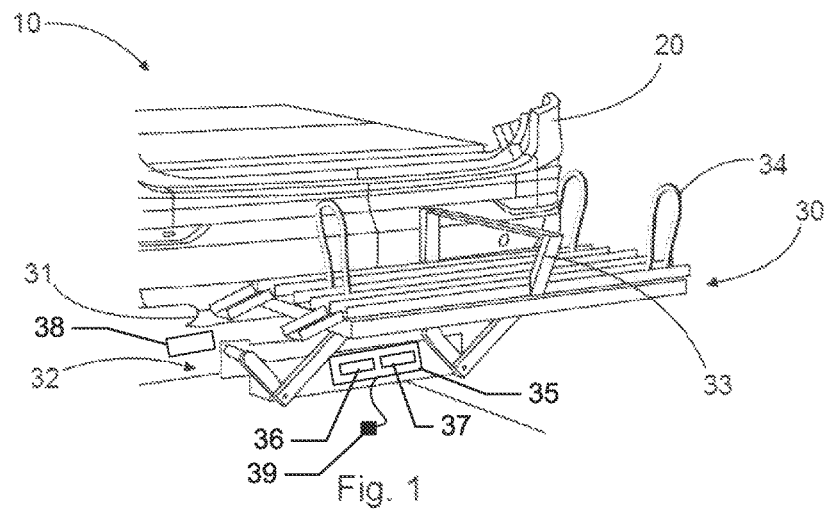
FIG. 1 is a schematic view of a rack system according to the preferred embodiment of the present disclosure arranged on a tow bar of a main motor vehicle.
Figure 2:
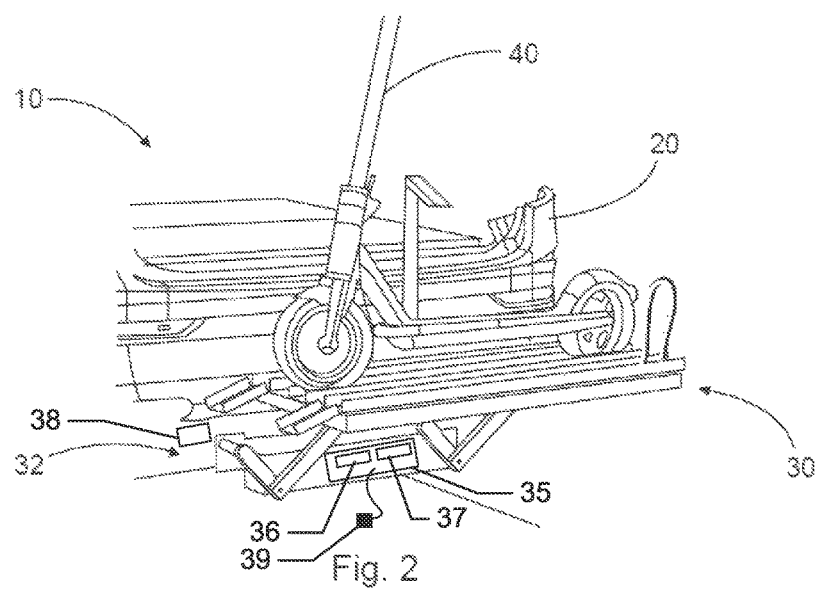
FIG. 2 is a schematic view of the rack system shown in FIG. 1 with an electric auxiliary vehicle.
Figure 3:
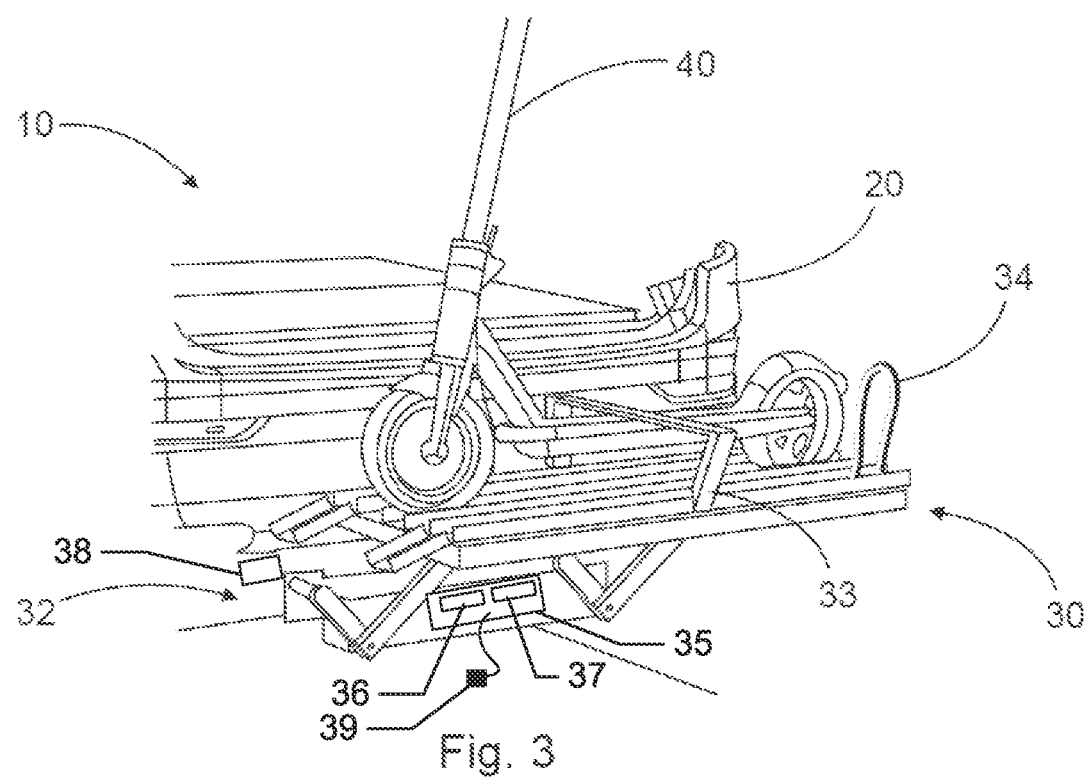
FIG. 3 is a schematic view of the rack system shown in FIG. 2 with an electric auxiliary vehicle.

FIGS. 1 to 3 shows a rack system 10 for a main motor vehicle 20. The rack system 10 comprises a rack unit 30 mounted to a rear side of the main motor vehicle 20, preferably to a tow bar (not shown) of the main motor vehicle 20.

As can be seen in FIGS. 2 and 3, the rack unit 30 is configured to carry at least one electric auxiliary vehicle 40, here a two-wheel vehicle 40. In this respect, the rack unit 30 preferably comprises u-shaped carrying elements/elongated bars 31 wherein the cross sections of the carrying elements 31 are adapted to the cross-section of the tires of the electric auxiliary vehicle 40 such that the tires of the electric auxiliary vehicle 40 can be positioned therein. The rack unit 30 comprises lifting means 32 configured to lift the electric auxiliary vehicle 40 from a street level position to an elevated level shown in the figures.

The rack unit 30 further comprises an electric charging unit 35 configured to electrically charge the battery unit of the at least one electric auxiliary vehicle 40 with more than 12 Volts. In this respect, it is preferred that the electric charging unit 35 is connected to at least one traction battery 38 of the main motor vehicle 20 so that the electric charging unit 35 obtains electrical energy from the traction battery 38 of the main motor vehicle 20. It is preferred that the main motor vehicle 20 is at least partially electrically drivable and not a vehicle with a drive system that only includes a combustion engine. This is preferred because such a vehicle includes a comparatively strong traction battery 38 that can also provide voltages above 12 volts, which is needed for electric auxiliary vehicles 40 having a long range and long operating time. The electrical charging unit 35 comprises electrical connection means 39 configured to provide an electrical connection to the battery unit of the electric auxiliary vehicle 40. Moreover, the electrical charging unit 35 may also comprise electrical connection means 39 configured to provide an electrical connection to a battery unit of an electric auxiliary vehicle arranged adjacent to the rack system 10, i.e. arranged adjacent to the main motor vehicle 20.

The rack unit 30 further comprises locking means configured to lock the electric auxiliary vehicle 40 relative to the rack unit 20. Here, the locking means are exemplarily provided by a bracket bar 33 and straps 34. Notably, the locking means may also comprise releasing means configured to allow a release of the electric auxiliary vehicle 40 from the rack unit 20 independent of an access to and/or operation of the main motor vehicle 20. This makes it possible, for example, for a third party who does not have access to the main vehicle 20 to position his electric auxiliary vehicle 40 on or at the rack unit 30 and charge it via the main motor vehicle 20. Such releasing means can be provided, for example, by a controllable locking element (not shown) with which the electric auxiliary vehicle 30 can be released from the rack unit 30.

Other variations to the disclosed embodiments can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 rack system
20 main motor vehicle
30 rack unit
31 carrier element
32 lifting means
33 bracket bar
34 straps
35 electrical charging unit
36 communication means
37 timing unit
38 traction battery
39 electrical connection means
40 electric auxiliary vehicle

What is claimed is:

1. A rack system for a main motor vehicle, comprising:
a rack unit mountable to a rear side of the main motor vehicle, wherein the rack unit is configured to carry at least one electric auxiliary vehicle comprising at least one battery unit to power the electric auxiliary vehicle;
an electric charging unit configured to electrically charge the at least one battery unit of the at least one electric auxiliary vehicle with more than 12 Volts, wherein the electric charging unit is arranged at the rack unit, and wherein the electric charging unit is configured to electrically charge the at least one battery of the at least one electric auxiliary vehicle independent of an access to or operation of the main motor vehicle;
a communication means configured to provide a communication between the rack system and a mobile computer device in order to perform an approval process for electrical charging by the electric charging unit before an electric auxiliary vehicle can be electrically charged by the electric charging unit; and
wherein the rack unit automatically obtains authorization for free parking in a parking space in response to providing free electrical charging to the at least one battery unit of the at least one main motor vehicle not associated with an owner of the main motor vehicle while the main motor vehicle is parked in the parking space.

2. The rack system according to claim 1, wherein the electric charging unit is configured to be connected to at least one traction battery of the main motor vehicle so that the electric charging unit obtains electrical energy from the traction battery of the main motor vehicle.

3. The rack system according to claim 1, wherein the electric charging unit comprises electrical connection means configured to provide an electrical connection to a battery unit of an electric auxiliary vehicle arranged adjacent to the rack system.

4. The rack system according to claim 1, wherein the electric charging unit is configured to electrically charge the at least one battery unit of the at least one electric auxiliary vehicle with a voltage of 24 Volt, 36 Volt, 42 Volt or 48 Volt.

5. The rack system according to claim 1, wherein the rack unit comprises mounting means configured to mount the rack unit to a rear part of the main motor vehicle.

6. The rack system according to claim 1, wherein the rack unit comprises lifting means configured to lift the electric auxiliary vehicle from a street level position to an elevated level.

7. The rack system according to claim 1, wherein the rack unit comprises a protection cover to protect the main motor vehicle from the electric auxiliary vehicle.

8. The rack system according to claim 1, wherein the rack unit comprises locking means configured to lock the electric auxiliary vehicle relative to the rack unit.

9. The rack system according to claim 1, wherein the rack unit comprises releasing means configured to allow a release of the electric auxiliary vehicle from the rack unit independent of an access to or operation of the main motor vehicle.

10. The rack system according to claim 1, wherein the rack unit manages a charging duration for charging a battery unit of the electric auxiliary vehicle based on an estimate parking duration of the main motor vehicle.

11. The rack system according to claim 1, wherein the at least one electric auxiliary vehicle to be carried by the rack unit comprises an electric two-wheel vehicle, and wherein the rack unit comprises at least one carrier element having a u-shaped cross-section in which wheels of the electric auxiliary vehicle are arrangeable.

12. A method to use a rack unit in a rack system or a charging unit in the rack system, the method comprising:
electrically charging, by the charging unit, at least one battery unit of an electric auxiliary vehicle independent of an access to or an operation of a main motor vehicle, wherein the rack system comprising:
the rack unit mountable to a rear side of the main motor vehicle, wherein the rack unit is configured to carry the electric auxiliary vehicle comprising the at least one battery unit to power the electric auxiliary vehicle; and
the electric charging unit configured to electrically charge the at least one battery unit of the electric auxiliary vehicle with more than 12 Volts, wherein the electric charging unit is arranged at the rack unit, and wherein the electric charging unit is configured to electrically charge the at least one battery of the at least one electric auxiliary vehicle independent of an access to or operation of the main motor vehicle;
a communication means configured to provide a communication between the rack system and a mobile computer device in order to perform an approval process for electrical charging by the electric charging unit before an electric auxiliary vehicle can be electrically charged by the electric charging unit; and
wherein the rack unit automatically obtains authorization for free parking in a parking space in response to providing free electrical charging to the at least one battery unit of the at least one main motor vehicle not associated with an owner of the main motor vehicle while the main motor vehicle is parked in the parking space.

13. The method of claim 12, wherein the electrically charging, by the charging unit, comprising electrically charging, by the charging unit, the at least one battery unit of the electric auxiliary vehicle with a voltage of 24 Volts, 36 Volts, 42 Volts or 48 Volts.

14. An electric motor vehicle comprising:
at least one traction battery; and
a rack system comprising:
- a rack unit mountable to a rear side of the main motor vehicle, wherein the rack unit is configured to carry at least one electric auxiliary vehicle comprising at least one battery unit to power the electric auxiliary vehicle;
- an electric charging unit configured to electrically charge the at least one battery unit of the at least one electric auxiliary vehicle with more than 12 Volts, wherein the electric charging unit is arranged at the rack unit, and wherein the electric charging unit is connected to the at least one traction battery of the electric motor vehicle, and wherein the electric charging unit is configured to electrically charge the at least one battery of the at least one electric auxiliary vehicle independent of an access to or operation of the masa electric motor vehicle; and
- a communication means configured to provide a communication between the rack system and a mobile computer device in order to perform an approval process for electrical charging by the electric charging unit before an electric auxiliary vehicle can be electrically charged by the electric charging unit; and
wherein the electric motor vehicle automatically obtains authorization to access a restricted area in response to providing free electrically charging to the at least one battery unit of the at least one electric auxiliary vehicle not associated with an owner of the electric motor vehicle while the electric motor vehicle is parked in the restricted area.

15. The electric motor vehicle of claim 14, wherein the electric charging unit is configured to be connected to at least one traction battery of the electric motor vehicle so that the electric charging unit obtains electrical energy from the traction battery of the electric motor vehicle.

16. The electric motor vehicle of claim 14, wherein the electric charging unit comprises electrical connection means configured to provide an electrical connection to a battery unit of an electric auxiliary vehicle arranged adjacent to the rack system.

17. The electric motor vehicle of claim 14, wherein the electric charging unit is configured to electrically charge the at least one battery unit of the at least one electric auxiliary vehicle with a voltage of 24 Volt, 36 Volt, 42 Volt or 48 Volt.

18. The electric motor vehicle of claim 14, wherein the rack unit comprises mounting means configured to mount the rack unit to a rear part of the electric motor vehicle.

19. The electric motor vehicle of claim 14, wherein the rack unit comprises lifting means configured to lift the electric auxiliary vehicle from a street level position to an elevated level.

20. The electric motor vehicle of claim 14, wherein the electric motor vehicle automatically obtains authorization for free parking in a parking space in response to providing the free electrical charging to the at least one battery unit of the at least one electric auxiliary vehicle not associated with an owner of the electric motor vehicle while the electric motor vehicle is parked in the parking space.

* * * * *